(12) United States Patent
Nonogaki et al.

(10) Patent No.: US 7,283,239 B2
(45) Date of Patent: Oct. 16, 2007

(54) METHOD FOR GENERATING A FORMULA FOR CALCULATING MOTTLING OF A PAINT FILM, AND A QUANTIFICATION METHOD OF THE MOTTLING

(75) Inventors: Yoshihiro Nonogaki, Handa (JP); Takao Asaba, Tokyo (JP)

(73) Assignee: Nippon Paint Co., Ltd., Osaka (JP)

( * ) Notice: Subject to any disclaimer, the term of this patent is extended or adjusted under 35 U.S.C. 154(b) by 426 days.

(21) Appl. No.: 10/812,599

(22) Filed: Mar. 30, 2004

(65) Prior Publication Data
US 2004/0190768 A1 Sep. 30, 2004

(30) Foreign Application Priority Data
Mar. 31, 2003 (JP) .............................. 2003-096128

(51) Int. Cl.
*G01J 3/46* (2006.01)

(52) U.S. Cl. ...................... 356/402; 356/405; 356/425; 382/162

(58) Field of Classification Search ................ 356/402, 356/405–408, 416–419, 425; 427/407.1, 427/409; 382/162–167; 702/183
See application file for complete search history.

(56) References Cited

FOREIGN PATENT DOCUMENTS

| JP | 6 1003016 | 1/1986 |
| JP | 05-288690 | 11/1993 |
| JP | 09-318448 | 12/1997 |
| JP | 1 0318841 | 12/1998 |
| JP | 2000 304696 | 11/2000 |

*Primary Examiner*—Layla G. Lauchman
(74) *Attorney, Agent, or Firm*—Ladas & Parry LLP

(57) ABSTRACT

A method for generating a calculation formula to obtain an accurate mottling value is disclosed. Two-dimensional data and color values of a target paint film are considered. The calculation formula provides a method for numerically expressing the mottling of the target paint film.

6 Claims, 8 Drawing Sheets

|  | AO20001 | AO20002 | AO20005 | AO20007 | AO20008 | AO20009 | AO20010 |
|---|---|---|---|---|---|---|---|
| ALUMINUM FLAKE PIGMENT A |  |  | 5.7 |  |  |  |  |
| ALUMINUM FLAKE PIGMENT B |  | 3.2 |  | 17.0 | 17.0 | 14.3 | 14.3 |
| ALUMINUM FLAKE PIGMENT C | 5.5 | 7.7 |  |  |  |  |  |
| ALUMINUM FLAKE PIGMENT D |  |  | 7.2 |  |  |  |  |
| ALUMINUM FLAKE PIGMENT E | 5.5 |  |  |  |  |  |  |
| CARBON BLACK PIGMENT A | 0.01 | 0.01 |  | 0.3 | 0.3 | 0.5 | 0.5 |
| ORGANIC REDDISH PIGMENT A | 0.02 | 0.02 |  |  |  |  |  |
| INORGANIC REDDISH PIGMENT A | 0.3 | 0.3 | 1.4 |  |  |  |  |
| ORGANIC YELLOWISH PIGMENT A |  |  | 0.05 |  |  |  |  |
| ORGANIC YELLOWISH PIGMENT B |  |  | 0.6 |  |  |  |  |
| ORGANIC BLUISH PIGMENT A |  |  |  | 0.3 | 0.3 | 3.0 | 3.0 |
| TOTAL PWC | 11.33 | 11.23 | 14.95 | 17.6 | 17.6 | 17.8 | 17.8 |

| | AO20001 | AO20002 | AO20005 | AO20007 | AO20008 | AO20009 | AO20010 |
|---|---|---|---|---|---|---|---|
| ALUMINUM FLAKE PIGMENT A | | | 5.7 | | | | |
| ALUMINUM FLAKE PIGMENT B | | 3.2 | | 17.0 | 17.0 | 14.3 | 14.3 |
| ALUMINUM FLAKE PIGMENT C | 5.5 | 7.7 | | | | | |
| ALUMINUM FLAKE PIGMENT D | | | 7.2 | | | | |
| ALUMINUM FLAKE PIGMENT E | 5.5 | | | | | | |
| CARBON BLACK PIGMENT A | 0.01 | 0.01 | | 0.3 | 0.3 | 0.5 | 0.5 |
| ORGANIC REDDISH PIGMENT A | 0.02 | 0.02 | | | | | |
| INORGANIC REDDISH PIGMENT A | 0.3 | 0.3 | 1.4 | | | | |
| ORGANIC YELLOWISH PIGMENT A | | | 0.05 | | | | |
| ORGANIC YELLOWISH PIGMENT B | | | 0.6 | 0.3 | 0.3 | 3.0 | 3.0 |
| ORGANIC BLUISH PIGMENT A | | | | | | | |
| TOTAL PWC | 11.33 | 11.23 | 14.95 | 17.6 | 17.6 | 17.8 | 17.8 |

FIG.5

PAINT PROCESS: BASE COATING TWICE WITH 90 SECOND INTERVALA

| PAINTING MACHINE | ABB 1N1072F |
|---|---|
| PAINT DISCHARGE RATE | 220 cc/min |
| SHAPING AIR | 520 Nm$^3$/min |
| ROTATION | 25000 RPM |
| PAINTING MACHINE LINEAR SPEED | 900 mm/min |
| DISTANCE TO PAINTING OBJECT | 300 mm |

FIG.6

MEASURED VALUE AND CALCULATED VALUE

| | PAINTED BOARD ID | AO20023 | AO20024 | AO20025 | AO20026 | AO20027 | AO20028 | AO20029 | AO20030 | AO20031 | AO20032 | AO20033 | AO20034 | AO20035 | AO20036 | AO20037 | AO20038 |
|---|---|---|---|---|---|---|---|---|---|---|---|---|---|---|---|---|---|
| | GLITTER REPRESENTING VALUE | 107 | 73 | 235 | 188 | 119 | 110 | 157 | 99 | 90 | 142 | 111 | 94 | 238 | 236 | 148 | 150 |
| VISUAL MOTTLING | MOTTLING | 2.75 | 3.25 | 2 | 2.5 | 3 | 3 | 2.75 | 3 | 3.25 | 2.75 | 3.5 | 3.25 | 2 | 2 | 2.75 | 3 |
| X-Rite 68M2 | 15° L* | 111.71 | 95.09 | 126.29 | 93.00 | 41.07 | 36.91 | 108.71 | 109.71 | 98.51 | 84.38 | 83.53 | 79.74 | 121.49 | 117.89 | 112.68 | 112.56 |
| | 15° a* | -4.71 | -4.26 | -8.25 | -37.80 | -27.88 | -24.10 | -5.56 | -4.62 | -4.71 | -28.46 | -24.63 | -23.40 | -8.16 | -7.78 | -5.49 | -5.33 |
| | 15° b* | -2.33 | -1.89 | -2.98 | -31.24 | -20.42 | -19.61 | -2.25 | -1.87 | -1.89 | -23.25 | -21.42 | -21.32 | -3.29 | -2.88 | -2.48 | -2.19 |
| | 25° L* | 93.53 | 83.26 | 94.72 | 68.27 | 28.23 | 25.28 | 89.72 | 92.67 | 85.42 | 67.48 | 70.45 | 69.33 | 93.90 | 91.83 | 90.33 | 89.87 |
| | 25° a* | -4.60 | -4.19 | -6.92 | -29.99 | -20.87 | -17.97 | -5.37 | -4.53 | -4.52 | -25.25 | -23.05 | -21.89 | -7.06 | -6.84 | -5.29 | -5.11 |
| | 25° b* | -1.57 | -1.41 | -2.64 | -25.39 | -16.43 | -15.82 | -1.93 | -1.32 | -1.75 | -20.86 | -20.25 | -20.09 | -2.58 | -2.44 | -1.77 | -1.80 |
| | 45° L* | 61.51 | 60.82 | 45.93 | 31.63 | 10.56 | 9.85 | 58.01 | 60.82 | 59.51 | 40.70 | 47.32 | 48.55 | 49.29 | 49.19 | 54.36 | 55.08 |
| | 45° a* | -3.45 | -3.36 | -3.72 | -14.15 | -7.96 | -6.35 | -3.81 | -3.20 | -3.50 | -16.08 | -17.14 | -16.88 | -4.04 | -4.04 | -3.47 | -3.47 |
| | 45° b* | -1.94 | -1.68 | -2.93 | -17.08 | -10.89 | -10.58 | -2.04 | -1.73 | -1.90 | -16.60 | -17.44 | -17.56 | -2.79 | -2.74 | -1.80 | -2.00 |
| | 75° L* | 36.06 | 39.83 | 22.70 | 12.76 | 3.42 | 3.52 | 35.07 | 36.92 | 38.06 | 22.39 | 28.27 | 30.34 | 23.71 | 23.71 | 32.37 | 32.78 |
| | 75° a* | -3.08 | -3.20 | -3.08 | -5.18 | 0.19 | 0.27 | -3.38 | -2.93 | -3.24 | -9.57 | -11.62 | -11.94 | -3.37 | -3.32 | -3.14 | -3.16 |
| | 75° b* | -2.14 | -1.97 | -3.13 | -12.86 | -4.91 | -5.18 | -2.43 | -2.07 | -2.10 | -13.50 | -14.87 | -15.76 | -3.26 | -3.22 | -2.38 | -2.28 |
| | 110° L* | 26.50 | 29.14 | 16.08 | 7.21 | 2.09 | 2.14 | 26.18 | 27.41 | 28.57 | 14.70 | 19.26 | 21.49 | 17.26 | 16.57 | 24.40 | 24.39 |
| | 110° a* | -3.45 | -3.32 | -3.50 | -2.78 | 1.26 | 1.27 | -3.68 | -3.23 | -3.46 | -7.45 | -9.30 | -9.92 | -3.89 | -3.61 | -3.46 | -3.46 |
| | 110° b* | -2.39 | -2.06 | -3.12 | -11.51 | -2.94 | -3.31 | -2.29 | -2.18 | -2.09 | -12.14 | -13.78 | -14.81 | -3.42 | -3.22 | -2.31 | -2.36 |
| | 15° C VALUE | 5.25 | 4.66 | 8.77 | 49.04 | 34.56 | 31.07 | 6.00 | 4.91 | 5.08 | 36.75 | 32.64 | 31.66 | 8.80 | 8.30 | 6.02 | 5.76 |
| | 25° C VALUE | 4.86 | 4.42 | 7.41 | 39.29 | 26.56 | 23.94 | 5.71 | 4.72 | 4.85 | 32.75 | 30.68 | 29.71 | 7.52 | 7.26 | 5.58 | 5.42 |
| | 45° C VALUE | 3.958042 | 3.756594 | 4.735325 | 22.17992 | 13.48902 | 12.33932 | 4.32177 | 3.837705 | 3.982462 | 23.11117 | 24.45287 | 24.3575 | 4.909756 | 4.881516 | 3.909079 | 4.005109 |
| | 75° C VALUE | 3.750467 | 3.757779 | 4.377271 | 13.86405 | 4.913675 | 5.187032 | 4.162848 | 3.58745 | 3.861036 | 16.54796 | 18.87171 | 19.77223 | 4.688763 | 4.625019 | 3.940051 | 3.896865 |
| | 110° C VALUE | 4.196975 | 3.907173 | 4.688752 | 11.84097 | 3.198625 | 3.545279 | 4.33434 | 3.896832 | 4.042239 | 14.24367 | 16.62463 | 17.82533 | 5.179624 | 4.904539 | 4.160252 | 4.188222 |
| | 15° -100° C VALUE | 1.06 | 0.75 | 4.08 | 37.20 | 31.36 | 27.52 | 1.66 | 1.02 | 1.03 | 22.51 | 16.02 | 13.83 | 3.62 | 3.39 | 1.86 | 1.57 |
| | 15° HUE ANGLE | 206.32 | 203.93 | 199.86 | 219.57 | 216.22 | 219.14 | 202.03 | 199.87 | 201.86 | 21.925 | 221.01 | 222.34 | 201.96 | 200.31 | 204.31 | 202.34 |
| | 25° HUE ANGLE | 198.84 | 198.60 | 200.88 | 220.25 | 218.21 | 221.36 | 199.77 | 196.25 | 201.16 | 219.56 | 221.30 | 222.54 | 200.07 | 199.63 | 198.50 | 199.40 |
| | 45° HUE ANGLE | 209.35 | 206.57 | 218.23 | 230.36 | 233.84 | 239.03 | 208.17 | 208.40 | 208.50 | 225.91 | 225.50 | 226.13 | 214.63 | 214.15 | 207.42 | 209.96 |
| | 75° HUE ANGLE | 94.62 | 93.87 | 101.01 | 150.72 | 156.94 | 157.55 | 95.30 | 94.32 | 94.20 | 132.56 | 127.67 | 126.25 | 100.70 | 101.00 | 95.57 | 95.34 |
| | 110° HUE ANGLE | 214.71 | 211.82 | 221.71 | 256.42 | 293.20 | 290.99 | 211.89 | 214.02 | 211.13 | 238.46 | 235.98 | 236.19 | 221.32 | 222.60 | 213.73 | 214.30 |
| | 15° -100° HUE ANGLE | -8.39 | -7.89 | -21.85 | -36.85 | -76.98 | -71.86 | -9.86 | -14.14 | -9.27 | -19.22 | -14.97 | -13.85 | -19.36 | -22.29 | -9.42 | -11.96 |
| | 15° -100° L* VALUE | 85.21 | 65.95 | 110.21 | 85.79 | 38.98 | 34.77 | 82.53 | 82.3 | 69.94 | 69.68 | 84.27 | 58.25 | 104.23 | 101.32 | 88.28 | 88.17 |

FIG.7

QSAR ANALYSIS

| | r^2 (CONTRIBUTION RATIO) | r (CORRELATION COEFFICIENT) | CORRELATION FORMULA |
|---|---|---|---|
| 1 | 0.774 | 0.885 | 3.35962+0.000474*X1^2+0.11361*⟨2.25-X1⟩^2+0.057642*⟨"X2"-97⟩-0.064096*⟨"X2"-90⟩-0.006376*⟨103.37-X3⟩+0.000767*⟨52.36-X4⟩^2 |
| 2 | 0.774 | 0.885 | 3.36022+0.000476*X1^2+0.000727*⟨53.49-X4⟩^2+0.113511*⟨2.25-X1⟩^2+0.057554*⟨"X2"-97⟩-0.064014*⟨"X2"-90⟩-0.006606*⟨103.37-X3⟩ |
| 3 | 0.774 | 0.885 | 3.2996+0.013184*X1-0.0007534*⟨95.09-X3⟩+0.000785*⟨52.36-X4⟩^2+0.130979*⟨2.25-X1⟩^2-0.065116*⟨"X2"-90⟩+0.058619*⟨"X2"-97⟩ |
| 4 | 0.773 | 0.885 | 3.34463-0.00732*⟨95.09-X3⟩+0.0008*⟨52.36-X4⟩^2+0.08307*⟨2.54-X1⟩^2+0.000443*X1^2+0.077622*⟨"X2"-95⟩-0.08417*⟨"X2"-90⟩ |
| 5 | 0.773 | 0.885 | 3.30917+0.08094*⟨"X2"-95⟩+0.012971*X1-0.007545*⟨95.09-X3⟩+0.0007773*⟨52.36-X4⟩^2+0.128525*⟨2.25-X1⟩^2-0.087593*⟨"X2"-90⟩ |
| 6 | 0.770 | 0.883 | 3.34619-0.007719*⟨95.09-X3⟩-0.041874*⟨"X2"-88⟩+0.000448*X1^2+0.08304*⟨2.54-X1⟩^2+0.000771*⟨53.49-X4⟩^2 |
| 7 | 0.770 | 0.883 | 3.38101+0.000461*X1^2-0.053049*⟨"X2"-88⟩-0.008198*⟨95.47-X3⟩+0.000655*⟨59.63-X3⟩^2+0.139831*⟨2.05-X1⟩^2+0.046682*⟨"X2"-97⟩ |
| 8 | 0.770 | 0.883 | 3.35299+0.000801*⟨52.36-X4⟩^2-0.007387*⟨95.09-X3⟩+0.042493*⟨"X2"-97⟩-0.049023*⟨"X2"-88⟩+0.000439*X1^2+0.111768*⟨2.25-X1⟩^2 |
| 9 | 0.770 | 0.883 | 3.35271+0.000705*⟨55.45-X4⟩^2-0.008205*⟨95.09-X3⟩+0.042084*⟨"X2"-97⟩-0.048633*⟨"X2"-88⟩+0.000441*X1^2+0.111394*⟨2.25-X1⟩^2 |
| 10 | 0.774 | 0.885 | 3.34303+0.000757*⟨53.49-X4⟩^2+0.117817*⟨2.25-X1⟩^2+0.058131*⟨"X2"-97⟩-0.064806*⟨"X2"-90⟩-0.007873*⟨95.09-X3⟩+0.013639*⟨"X1"-3.99⟩ |

| | |
|---|---|
| 45° CHROMA SATURATION | X1 |
| GLITTER REPRESENTING VALUE | X2 |
| 15° L* | X3 |
| BRIGHTNESS FF | X4 |
| HUE ANGLE FF | X5 |
| CHROMA SATURATION FF | X6 |
| 45° HUE ANGLE | X7 |
| VISUAL MOTTLING VALUE | y |

METHOD FOR GENERATING A FORMULA FOR CALCULATING MOTTLING OF A PAINT FILM, AND A QUANTIFICATION METHOD OF THE MOTTLING

BACKGROUND OF THE INVENTION

The present invention generally relates to a method for generating a formula for calculating mottling of a paint film, and a quantification method of the mottling.

It is practiced that colors are blended such that a color desired by a user is obtained. At that time, success or failure of blending is determined by evaluating performance such as paint finish performance, paint film performance, and paint material performance of an actually blended paint. However, user preference is highly diversified, and the number of colors required by users can be as great as the number of the users. For this reason, past data are often inapplicable, and testing of each color is required, resulting in the need for a large amount of manpower and time.

Under situations as described above, it is highly desired that a calculation formula (prediction formula) be established such that performance of a blended paint is predicted, and only a successful blending is provided to the users.

In order to determine successful blending without performance problems, information about performance, such as the paint finish performance, the paint film performance, and the paint material performance, is quantified and evaluated based on past actual results, etc. Here, the paint finish performance is related to skin, gloss, mottling, sagging, pinholes, workability to a production line, etc; the paint film performance is related to durability (degree of degradation due to the sunlight), corrosion resistance (degree of degradation due to rust and water), adhesion, chipping nature, hardness, electric resistance, gloss, chemical resistance, etc.; and the paint material performance is related to storage durability, dilution stability, circulation-proof nature, etc.

In this manner, the performance of a blended paint is predictable, and whether an acceptable quality of the paint is obtainable can be determined using the information described above, and the problem about time and effort is solved.

However, in the case that a paint contains glittering color material (such as metal flakes, and pearlescent mica), the color of the paint changes with viewing angle, and evaluation of the mottling is especially difficult.

In this connection, JP, 5-288690, A (patent reference 1) discloses "A paint mottling determination method of a metallic paint film", wherein by an irradiation process, a laser light having a beam diameter of 5-to-10 mm is irradiated to the surface of a target (to be measured) paint film of a metallic paint, and the laser light is irradiated at a predetermined angle of incidence, and by a light-receiving process, the laser light reflected by the target paint film is received. The irradiation process and the light-receiving process are carried out at two or more contiguous spots that are apart from each other by a distance equal to or less than the laser beam diameter, and optical brightness of the reflected light that is received is calculated at two or more predetermined wavelengths, which process is repeated for all the spots. According to the optical brightness at the predetermined wavelengths of all the spots, the degree of paint mottling is determined.

Further, JP, 9-318448, A (patent reference 2) discloses "A mottling determination apparatus and an evaluation method of metallic paints" wherein a light is irradiated to a target paint surface, the brightness of the reflected light is continually measured, the reflected light being received at angles at which mirror reflection light is not received (i.e., the specularly reflected light being excepted), and a degree of mottling of the surface of the target paint is determined by calculating (1) the difference between the brightness of the received light that exceeds an average of the measured brightness by a predetermined amount, and the brightness that is less than the average of the measured brightness by the predetermined amount, and (2) the distance between a spot that gives the brightness that exceeds the average by the predetermined amount, and a spot that gives the brightness that is less than the average by the predetermined amount.

Nevertheless, according to the inventions disclosed by the patent references 1 and 2 presented above, the amount of reflected light is measured only along a predetermined line on the paint film, and only the brightness is considered in determining the mottling. For this reason, precision of the mottling determination is not sufficient. In other words, the mottling, which essentially is a two-dimensional object, is determined based only on measurement data along a line (one dimension), and only the brightness, and the mottling of the surface in two dimensions cannot be properly determined.

SUMMARY OF THE INVENTION

Accordingly, it is a general object of the present invention to provide a method for generating a calculation formula of the paint mottling based on two-dimensional data and color values of a target paint film surface to obtain an accurate representation of the paint mottling, and a quantification method for quantifying (expressing in numerical terms) the paint mottling, the formula generating method and the quantification method substantially obviating one or more of the problems caused by the limitations and disadvantages of the related art.

Features and advantages of the present invention are set forth in the description that follows, and in part will become apparent from the description and the accompanying drawings, or may be learned by practice of the invention according to the teachings provided in the description. Objects as well as other features and advantages of the present invention will be realized and attained by the methods particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides an image generating step for generating a two-dimensional brightness image of a target paint film; a glitter representing value calculating step for calculating a glitter representing value from the two-dimensional brightness image; a color value acquisition step for obtaining color values of a reflected light of an incident light received at predetermined viewing angles to the target paint film; a visual evaluation value acquisition step for obtaining a visual evaluation value of the paint mottling of the target paint film; and an mottling calculating step for obtaining a formula for calculating the paint mottling based on the glitter representing value, the color values and the visual evaluation value. In this manner, the paint mottling calculated by the calculation formula generated according to the present invention is precise, because the method considers two-dimensional data (not just data along a one-dimensional line), and the color data (in addition to brightness data).

An aspect of the present invention is characterized by an image pick-up apparatus, such as a scanner and a CCD camera, being used in the image generating step such that an image suitable for the target paint surface is obtained.

An aspect of the present invention is characterized by the glitter representing value calculating step including an image processing step for processing the brightness image using a spatial-frequency differential process, and a total calculating step for obtaining a total of gradation steps of the brightness image that is processed at the image processing step. In this manner, the glitter representing value is easily obtained.

An aspect of the present invention is characterized by the spatial-frequency differential process using one of a Sobel filter, a Roberts filter, and a Laplacian filter. In this manner, the glitter representing value can be obtained by using commercial software.

An aspect of the present invention is characterized by the color value acquisition step obtaining at least one of a chroma value, an FF value thereof, a brightness value, an FF value thereof at the predetermined light-receiving angles, a hue angle at the above-mentioned predetermined angles, and a hue angle difference. In this manner, a paint mottling value can be obtained using a selection of color values that is suitable for the target paint film.

An aspect of the present invention is characterized by generating the formula for calculating mottling using QSAR analysis software. In this manner, by using a sample painted panel provided by a customer, a formula for calculating mottling that has correlations suitable for the customer, and a mottling value suitable for the customer can be obtained.

The present invention also provides a quantification method for quantifying the paint mottling of the target paint film based on the color values and data in two dimensions.

BRIEF DESCRIPTION OF THE DRAWINGS

FIG. 7 shows an example of QSAR analysis results; and

DESCRIPTION OF THE PREFERRED EMBODIMENTS

In the following, embodiments of the present invention are described with reference to the accompanying drawings.

(Generating a Formula for Calculating Paint Film Mottling)

Figure 1:
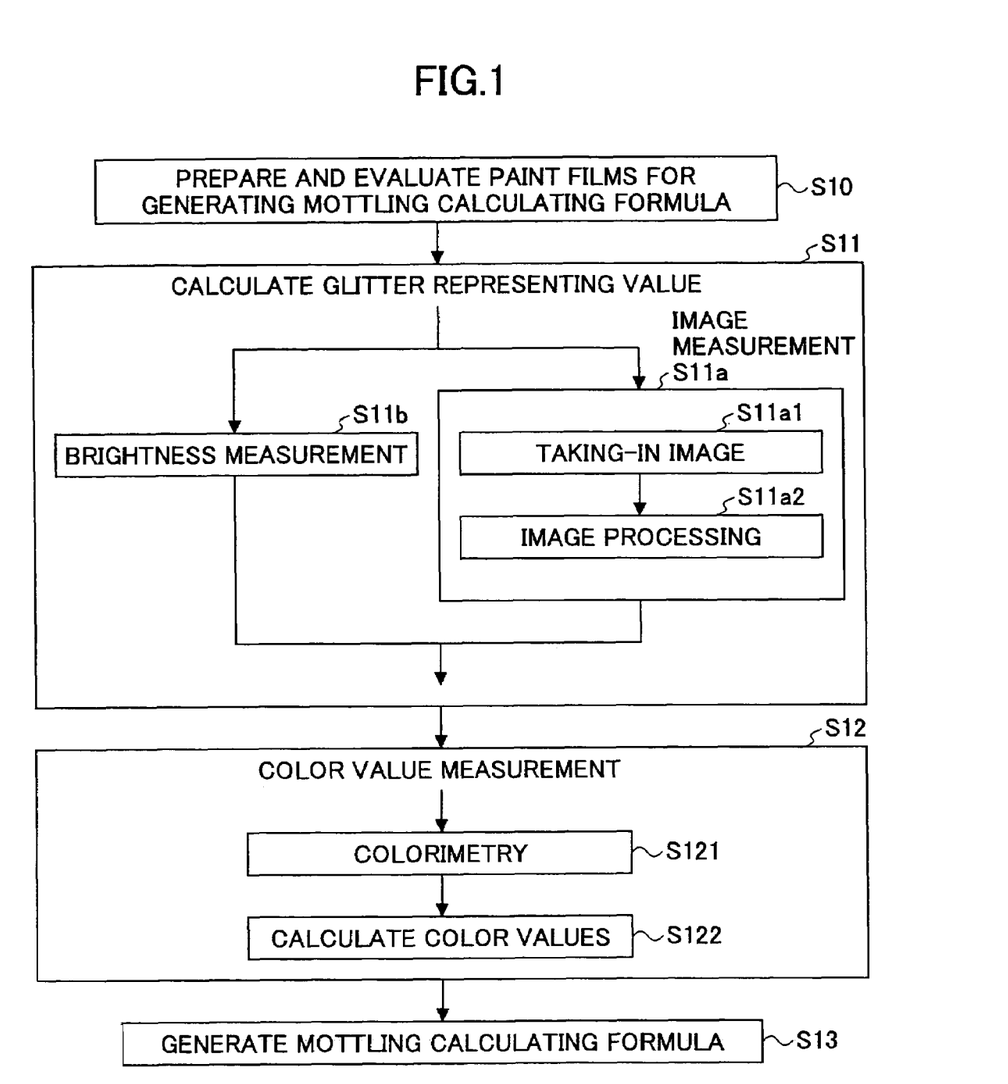
FIG. 1 is a flowchart showing a process for generating a formula for calculating mottling of a paint film.

FIG. 1 shows a process for generating a formula for calculating paint film mottling wherein target painted panels are prepared and evaluated at step S10, glitter representing values are calculated at step S11, colorimetric values are measured at step S12, and the formula for calculating the paint film mottling is obtained at step S13. Here, the steps S11 and S12 do not have to be in this sequence, but may be performed in the reverse sequence, or may be simultaneously processed.

At step S10 wherein the target painted panels are prepared and evaluated, the following process is carried out.

(1) Two or more paints using various glittering materials and pigments are prepared. The larger the number of different paints that are prepared, the higher the correlation of the formula to visible mottling can be obtained.

(2) The paints are applied to the panels such that a paint film is formed on the painted panels. When painting the panels, two or more panels are painted with the same paint, but with different spraying conditions, which painting is repeated for all the prepared paints.

(3) The dimensions of the panels prepared are desired to be 300×400 mm or larger such that visual evaluation of mottling is facilitated.

Then, visual evaluation of the panels prepared as above is performed.

Step S11 wherein the glitter representing value is calculated includes image measurement step S11a that further includes image inputting step S11a1, and image processing step S11a2. Step S11a can be replaced with brightness measurement step S11b as described later.

The image inputting step S11a1 takes in images of the paint film of the painted panels prepared at step S10 using an image taking apparatus such as a scanner, a CCD camera, and an image pick-up apparatus with appropriate software. Then, the images are saved with suitable file names attached.

At the image processing step S11a2, a suitable pretreatment, such as noise removal, is performed, and then pseudo-glitter (simulated glitter) of the glittering material is extracted using image-processing software that is capable of extracting the glitter of the image taken in at the image inputting step S11a1. Subsequently, the glitter representing value of the obtained image is computed.

Here, as image-processing software that is capable of extracting glitter after the pretreatment, one of a Sobel filter, a Roberts filter, and a Laplacian filter, etc., that performs spatial-frequency differential processing is used.

The glitter representing value is calculated as follows, for example.

(1) Gradation step values are totaled, and the sum is used as the glitter representing value, the gradation step values being those of the image on which the spatial-frequency differential processing is performed.

(2) After a suitable pretreatment, such as noise removal, a gradation step value that has the maximum frequency (the number of occurrences is the greatest) is made to be the glitter representing value, the gradation step value excepting the white value and the black value.

Alternatively, the glitter representing value calculation step S11 can use the brightness measurement step S11b. At S11b, pseudo-glitter of the glittering material is extracted from the amount of the received reflection light at angles at which a mirror reflection light is not received (i.e., the specularly reflected light is excepted) using a method for continuously measuring the brightness of the surface of a paint film; for example, a glitter measuring instrument ALCOPE made by Kansai Paint Engineering, Ltd. can be used, the reflection light being the reflection of a light irradiated to the target painted panels that are prepared at step S10.

After step S11, the process proceeds to step S12 for processing color value measurement that includes colorimetry step S121, and color value calculation step S122.

At the colorimetry step S121, the paint film of the painted panels prepared at step S10 is measured using a variable angle color meter (a calorimeter), and colorimetric values are obtained. Measurement conditions are the incident-light angle being set at 45 degrees, light-receiving angles being set at 15 degrees, 25 degrees, 45 degrees, 75 degrees, and 110 degrees. At this time, CIELAB is used as the color coordinate system in this example.

Then, the color value calculation process at step S122 is performed using the colorimetric values obtained at step S121. Here, the color values to be used are $L^*$, $a^*$, and $b^*$ values measured at 15, 25, 45, 75, and 110 degrees, and values calculated therefrom (refer to FIG. 6).

Based on the colorimetric values measured at step S121, each color value is calculated at step S122 according to the following formulae.

a. $C^*$ value at 15 degrees=$(15$ degree $(a^*)^2+15$ degree $(b^*)^2)^{0.5}$
b. $C^*$ value at 25 degrees=$(25$ degree $(a^*)^2+25$ degree $(b^*)^2)^{0.5}$
c. $C^*$ value at 45 degrees=$(45$ degree $(a^*)^2+45$ degree $(b^*)^2)^{0.5}$
d. $C^*$ value at 75 degrees=$(75$ degree $(a^*)^2+75$ degree $(b^*)^2)^{0.5}$
e. $C^*$ value at 110 degrees=$(110$ degree $(a^*)^2+110$ degree $(b^*)^2)^{0.5}$
f. $C^*$ value FF=($C^*$ value at 15 degree−$C^*$ value at 110 degrees)
g. hue angle difference [hue angle at 15 degrees−hue angle at 110 degrees]=(15 degree hue angle)−(110−degree hue angle)
h. 15 degree hue angle
i. 25 degree hue angle
j. 45 degree hue angle
k. 75 degree hue angle
l. 110 degree hue angle
m. Brightness FF=($L^*$ value at 15 degrees−$L^*$ value at 110 degrees)

Figure 2:
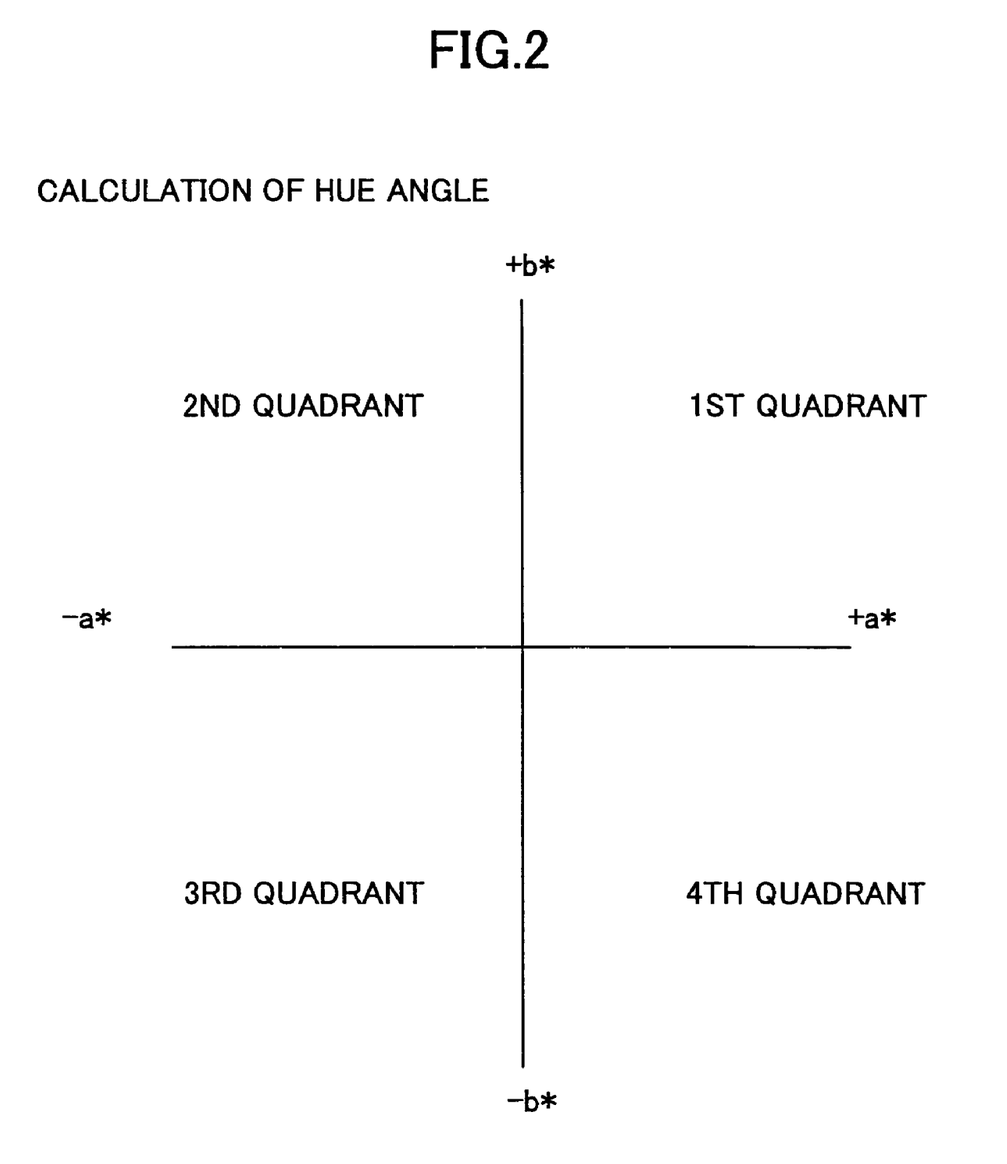
FIG. 2 is a chart for explaining a hue angle calculation.

Here, a hue angle is calculated as follows depending on to which quadrant the hue angle belongs (refer to FIG. 2 showing $a^*$-$b^*$ plane.)

The hue angle in the 1st quadrant is expressed by $\tan^{-1}(b^*/a^*)$.

The hue angle in the 2nd quadrant is expressed by $\tan^{-1}(-a^*/b^*) +90$ degrees.

The hue angle in the 3rd quadrant is expressed by $\tan^{-1}(b^*/a^*) +180$ degrees.

The hue angle in the 4th quadrant is expressed by $\tan^{-1}(a^*/-b^*)+270$ degrees.

Following the color value measurement step S12, the paint film mottling calculation formula is generate at step S13.

Since the mottling is dependent on psychophysical values, such as glitter and hue, a correlation formula between the visual mottling and the psychophysical values obtained by measurements is to be established. This is the difference of the present invention using psychophysical values from conventional practices considering only physical values, such as the brightness of the reflective light. In other words, since visual mottling is not a physical value but a psychophysical value, the present invention aims at obtaining correspondence of visually measured mottling values to calculated mottling values by defining a correlation formula wherein the psychophysical values and the visual mottling are considered.

In the present invention, the formula for calculating paint film mottling is obtained as follows.

(1) First, a visual mottling value y is defined as a function of factors x1 through xn. Here, as the factors x1 through xn, the glitter representing value acquired at the glitter representing value calculation step S11, the colorimetric values acquired at the colorimetry step S121, and the color values acquired at the color value calculation step S122 are used (refer to FIG. 6).

Figure 6:
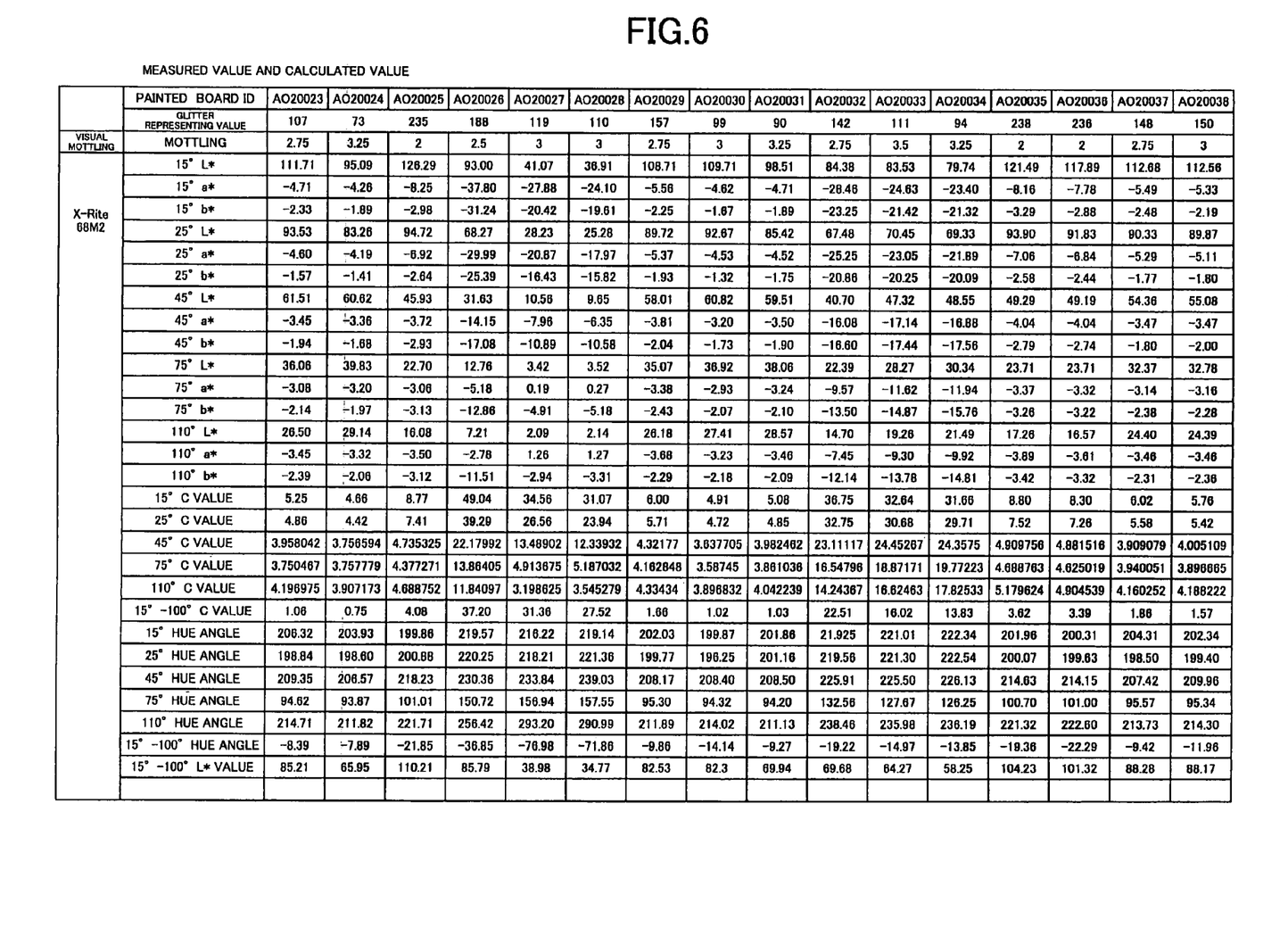
FIG. 6 is a table showing an example of colorimetric values and color values of paint films.

(2) A table listing y, and x1 through xn, such as shown by FIG. 6, is generated.

(3) Using QSAR analysis software, the table described as above (2), which lists the results and the factors, is analyzed, and a correlation formula is obtained, wherein factors xi that give high correlation to y are selectively used, as shown by FIG. 7.

(4) In this manner, the mottling of the paint films is numerically expressed (i.e., quantified) using the correlation formula.

(5) The correlation formula varies with kinds of data (properties of the paint film) to be used for analysis, and factors for analysis.

Therefore, by using painted panels provided by a customer, correlation formulas suitable for the customer can be generated.

Further, an mottling value that meets the requirement of the customer can be calculated by using the correlation formula.

(Application of the Correlation Formula)

In the following, a method for obtaining the paint film mottling using the formula that is obtained as described above is explained.

Figure 3:
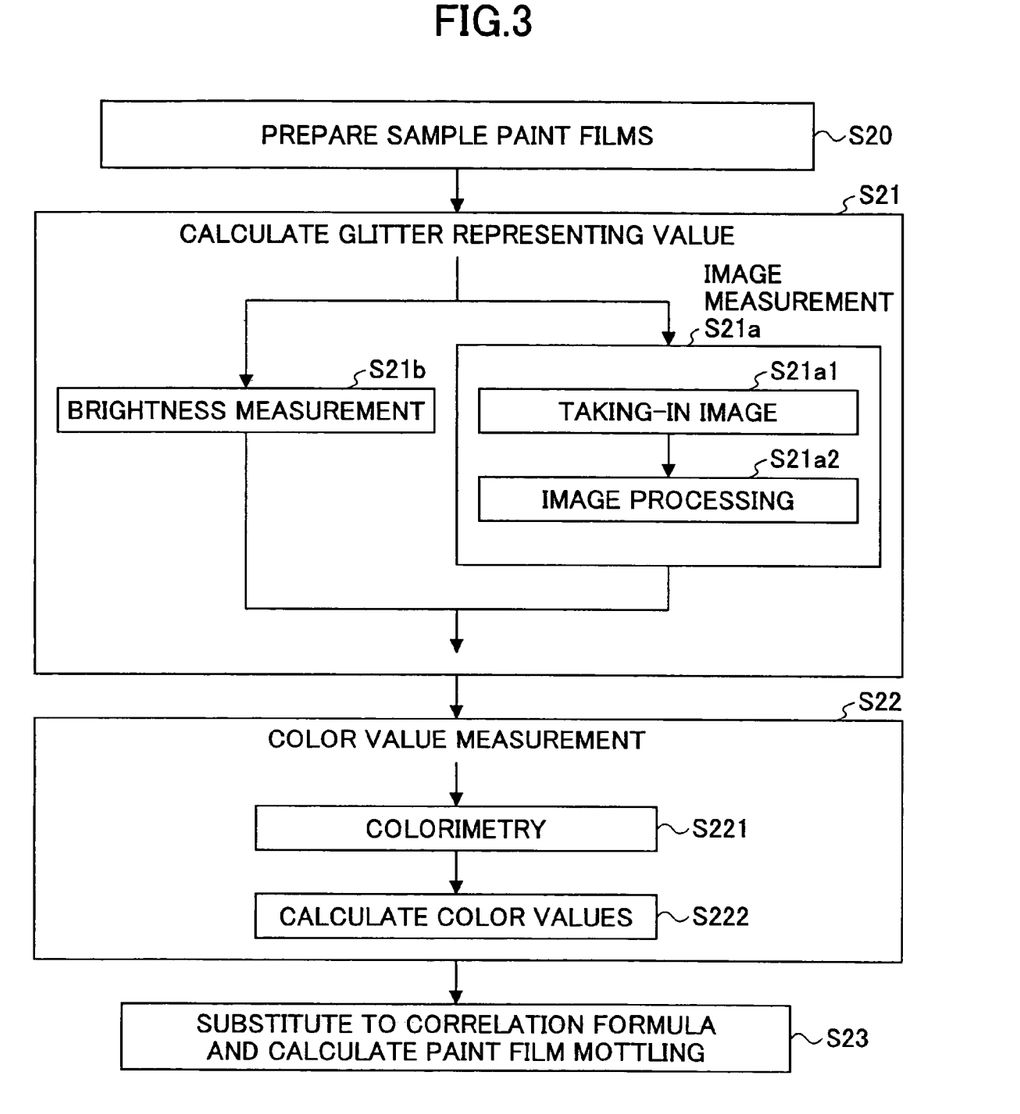
FIG. 3 is a flowchart showing a process for calculating the paint film mottling.

In reference to FIG. 3, sample painted panels are prepared at step S20, the glitter representing value is calculated at step S21, the color values are obtained at step S22, and the obtained values are substituted in the correlation formula at step S23. Here, the sequence of steps S21 and S22 can be reversed, or alternatively, steps S21 and S22 may be simultaneously processed.

At step S20, the sample painted panels are prepared with various glittering materials, and pigments. Painting conditions are the same as described for step S10.

At step S21, the glitter representing value is calculated by the same method as described for step S11.

At step S22, the colorimetric values are measured by the same method as described for step S12 using a variable angle calorimeter, and the color values are calculated from the colorimetric values.

At step S23, the glitter representing value acquired at step S21, and the color values acquired at step S22 are substituted in the correlation formula obtained at step S13, and the mottling value of the target paint film is obtained.

In addition, in the present invention, instead of actually preparing sample painted panels, the glitter representing value and the color value's of a paint combination can be estimated from paints to be mixed and glittering material information, and applied to the correlation formula such that an estimated film mottling value of the paint combination is predicted.

Further, although the glitter representing value and the color values of the sample painted panels are applied to the correlation formula, the glitter representing value and the color values of an actual item, such as a car, can be applied.

EXAMPLE

Next, the embodiments of the present invention that were actually experimented with are explained referring to the attached drawings.

(A. Preparing Painted Panels)

(1) Preparing Paints for Map Generation

Figure 4:
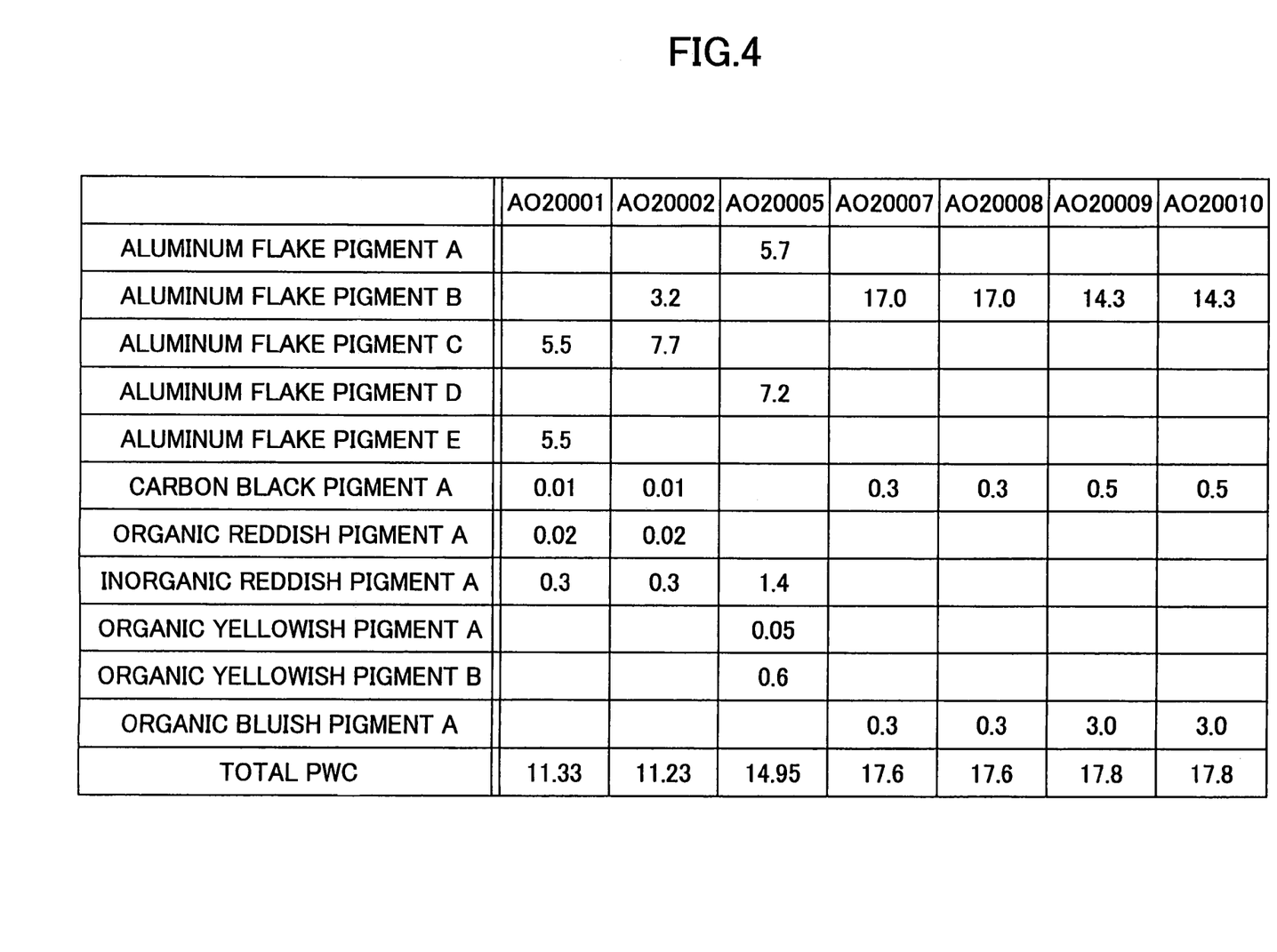
FIG. 4 is a table showing pigment compositions (pwc)

About 80 different waterborne paints for automobiles 2-coat 1-bake were prepared, pigment composition (pwc) of which was 10 parts of an acrylic resin, 30 parts of a melamine resin, and 40 parts of a urethane system emulsion. FIG. 4 shows seven paints selected from the "about 80 paints", the seven paints being identified by A020001, A020002, A020005, A020007, A020008, A020009 and A020010, respectively.

(2) Painting

Figure 5:
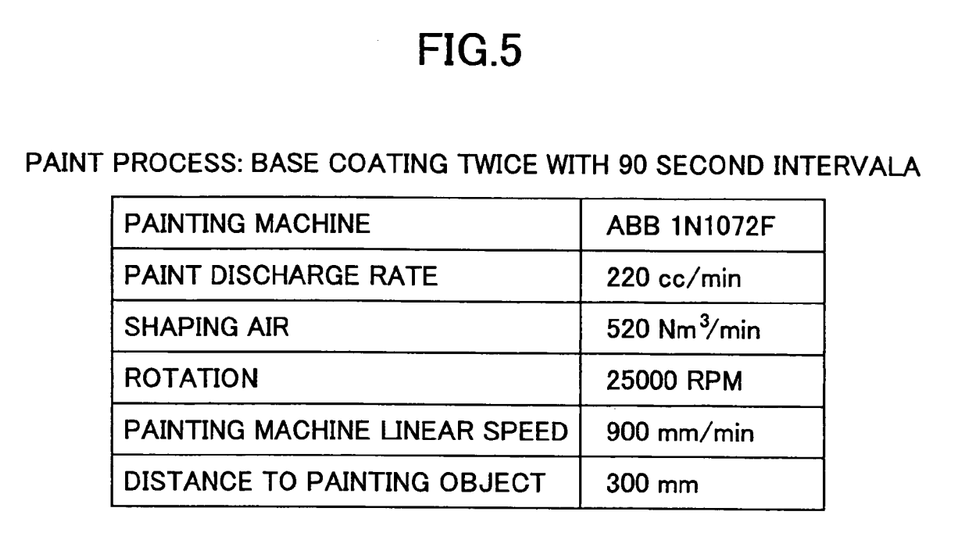
FIG. 5 shows painting conditions.

The paints prepared at (1) above were applied to panels using a bell type paint machine "ABB1N1072F" made by ABB under conditions described in FIG. 5. The panels were prepared in dimensions of 300 mm×400 mm; and electrodeposition for cars and middle coating were applied to the panels. The panels were preheated at 80 degrees C. for 3 minutes; a top clear coat was painted on the panels; and baking was performed on the panels at 140 degrees C. for 30 minutes.

Here, the painting included two base coating steps, with a 90 second interval in-between.

(B. Measurement of the glitter representing value)

The glitter representing value was determined as follows.

(1) Taking in of an image

Image taking-in software and a flat bed scanner (Canoscan D2400U) were used to take in the image of the painted panels prepared above (at A. Preparing paint film) to a personal computer as bit map data having resolution of 300 dpi and a 256-step gray scale.

(2) Image processing

Using image-processing software (Adobe Photoshop), both edges containing a large amount of noise were removed from the image that was taken in above (at B. (1) Taking in of an image), then a Sobel filter was applied. After a post-treatment, the image was quantified (made to be numerically expressed) based on the frequency of edge detection and the like, and the numerical value was made to serve as the glitter representing value.

(C. Measurement of color values)

Colorimetric values of the painted panels were obtained using MA-68II (Portable Multi-Angle Spectrophotometer) made by X-Rite. The color coordinate system of CIELAB was used.

MA-68II is a multi-angle spectrophotometer capable of aspecular measurements of L*a*b*, $\Delta L^* \Delta a^* \Delta b^*$, L*C*h degrees, $\Delta L^*$, $\Delta C^*$, $\Delta H^*$, a flop index, $\Delta$flop index, and so on. Further, the spectrophotometer has a 45-degree illumination, enabling measurements at 15, 25, 45, 75, and 110 degrees.

Using the colorimetric values obtained as above, color values described at the step S122 (color value calculation step) were calculated.

(D. mottling visual evaluation)

Mottling of the panels prepared at "preparing painted panels" was visually evaluated, and a visual mottling value was determined.

(E. Calculation of a correlation formula)

Then, the correlation formula was generated using QSAR analysis software (Cerius2 made by Accelrys) with the visual mottling value serving as an objective variable, and the glitter representing value, the colorimetric values, and the color values being the variables.

FIG. 6 tables the glitter representing value, the visual mottling value, the colorimetric values, and the color values of painted panels having IDs "A020023" through "A020038".

An example of the QSAR analysis is shown in FIG. 7, where 10 correlation formulae and respective parameters that contribute to each of the correlation formulas are shown. There, X1 represents the chroma saturation (C*) at 45 degree light-receiving angle, X2 represents the glitter representing value, X3 represents L* at 15 degree light-receiving angle, X4 represents the brightness FF (i.e., 15 degree L* value–110 degree L* value), X5 represents the hue angle FF (i.e., 15 degree hue angle–110 degree hue angle), X6 represents the chroma saturation FF (i.e., 15 degree C* value–110 degree C* value), X7 represents the hue angles at 45 degree light-receiving angle, and y represents the visual mottling.

From the QSAR analysis results, an mottling calculation formula that gives the highest correlation to the visual mottling (serving as an objective variable) was made the mottling value calculation formula y. The correlation formula given in the first line of FIG. 7 was adopted, which was generalized as follows.

$$y = A + bX12 + cXa2 + dX2a + eX2b + fX3a + gX4a \quad \text{Formula (1)}$$

Here, the variables are as follows.

y: mottling value
X1=45 degree C* value,
X2=glitter representing value
X3=15 degree L* value
X4=brightness FF value (15 degree L* value–110 degree L* value)
X1$a$=(2.25–X1)
X2$a$=(X2–97.0)
X2$b$=(X2–90.0)
X3$a$=(103.37–X3)
X4$a$=(52.36–X4)

Here, as for X1$a$, X2$a$, X2$b$, X3$a$, and X4$a$, if the value is less than "0", the value is made to be "0".

That is, X1$a$ is valid when X1 is less than 2.25, X2$a$ is valid when X2 exceeds 97, X2$b$ is valid when X2 exceeds 90, X3$a$ is valid when X3 is less than 103.37, and X4$a$ is valid when X4 is less than 52.36.

Further, a through g are constants having values as follows.

a=3.35962  b=0.000474  c=0.11361  d=0.057642
e=–0.064096  f=–0.006376  g=0.000767

Here, the correlation coefficient R of the visual mottling value to the mottling value according to Formula (1) was 0.885.

Figure 8:
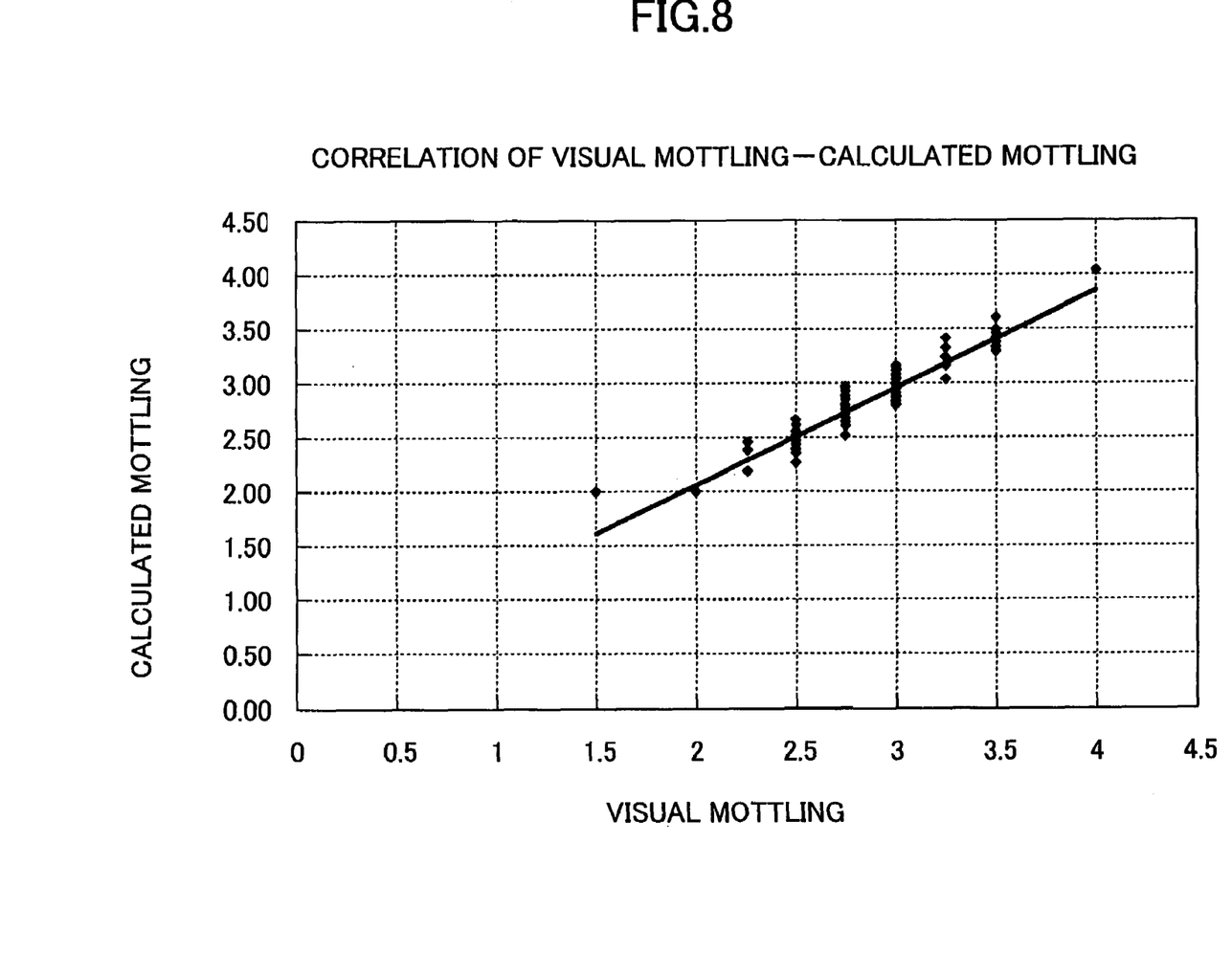
FIG. 8 graphs correlations between visual mottling and calculated mottling.

FIG. 8 shows the correlation of the visual mottling values to the calculated mottling values obtained using the correlation formula (1). As seen from FIG. 8, the correlation formula (1) gives high correlations to the visual mottling values, and proves to be a reliable tool.

(F. Application of the mottling formula)

The mottling values of actual painted panels were calculated using the formula (1), and the results are explained in the following.

(1) Preparing a sample paint

A waterborne paint for automobiles 2-coat 1-bake consisting of 10 parts of an acrylic resin, 30 parts of a melamine resin, and 40 parts of a urethane system emulsion was prepared with pigment composition (PWC) of:

| | |
|---|---|
| Aluminum flake pigment A | 5.3 |
| Carbon black pigment A | 1.8 |
| Organic blue pigment A | 7.2 |
| Total | 14.3. |

(2) Preparing Painted Panels

The paint prepared at (1) above was applied to panels using a bell type paint machine "ABB1N1072F" made by ABB under conditions described in FIG. 5. The panels were prepared in dimensions of 300 mm×400 mm; and electrodeposition for cars and middle coating were applied to the panels. The panels were preheated at 80 degrees C. for 3 minutes; a top clear coat was painted on the panels; and baking was performed on the panels at 140 degrees C. for 30 minutes.

(3) Taking in an image

Image taking-in software and a flat bed scanner were used to take in an image of the painted panel prepared in (2) above as bit map data to a personal computer at a resolution of 300 dpi in 256 gray-scale steps.

(4) Image processing

Using image-processing software (Adobe Photoshop), both edges containing a large amount of noise were removed from the image that was taken in above (at (3) Taking in an image), then a Sobel filter was applied. After a post-treatment, the glitter representing value was obtained. (5) Measurement of color values Colorimetric values of the painted panel were obtained using MA-68II (Portable Multi-Angle Spectrophotometer) made by X-Rite. The color coordinate system of CIELAB was used.

The color values were calculated using the colorimetric values, the color values having been explained at step S122 (color value calculation step) above.

Here, the painted panel identified as "A020025" in FIG. 6 was used.

(6) Calculation of the mottling value

Substituting the above-mentioned values in the mottling calculation formula (1), the mottling value was computed. Here, values of X1 through X4a were as follows.

| | | | |
|---|---|---|---|
| $X1 = 4.74$ | $X2 = 235$ | $X3 = 126.29$ | $X4 = 110.21$ |
| $X1a = 0$ | $X2a = 138$ | $X2b = 145$ | $X3a = 0$ |
| $X4a = 0$ | | | |

The mottling value y was calculated as y=2.03, which sufficiently compares with the visual mottling value 2 of the painted panel "A020025".

In this manner, an mottling value almost equal to the visual evaluation was acquired by calculation.

Since the color values of the target paint film were used according to the present invention, the mottling of the paint film was accurately determined by calculation.

As described above, according to the present invention, the method for obtaining the paint film mottling calculation formula, and the method for quantifying the paint film mottling that give accurate paint film mottling values are provided, using two-dimensional data and color values of the target paint film.

Further, the present invention is not limited to these embodiments, but various variations and modifications may be made without departing from the scope of the present invention.

The present application is based on Japanese Priority Application No. 2003-096128 filed on Mar. 31, 2003 with the Japanese Patent Office, the entire contents of which are hereby incorporated by reference.

What is claimed is:

1. A method comprising the steps of:

an image generation step for generating a brightness image of a paint film containing a glittering material based on a light that is irradiated to and reflected by the paint film, a glitter representing value calculation step for calculating a glitter representing value that represents properties of the brightness image generated at the image generation step, a color value acquisition step acquiring color values of the reflected light in one or more predetermined light-receiving angles, colorimetry of the reflected light being separately performed, a visual evaluation value acquisition step for acquiring a visual evaluation value of the mottling of the paint film, the visual evaluation being separately carried out, a calculation formula generating step for generating a mottling calculation formula of the paint film based on the glitter representing value calculated at the glitter representing value calculation step, the color values acquired at the color value acquisition step, and the visual evaluation value acquired at the visual evaluation value acquisition step, an evaluation step for numerically evaluating mottling of other paint film using the generated mottling value calculation formula, and an output step for outputting a result of the evaluation step to a user.

2. The method as claimed in claim 1, wherein the image generation step comprises generating an image using one of a scanner, a CCD camera, and an image pick-up apparatus.

3. The method as claimed in claim 1, wherein the glitter representing value calculation step comprises:

an image-processing step for processing the brightness image by a spatial-frequency differential process, and a totaling step for totaling gradation step values of the brightness image that is processed at the image-processing step.

4. The method as claimed in claim 3, wherein the spatial-frequency differential process employs one of a Sobel filter, a Roberts filter, and a Laplacian filter.

5. The method as claimed in claim 1, wherein the color value acquisition step acquires at least one of a chroma value, an FF value of the chroma value, a brightness value, an FF value of the brightness value, a hue angle, and a hue angle difference in the predetermined light-receiving angles.

6. The method as claimed in claim 1, wherein the calculation formula is generated using Quantitative Structure-Activity Relationship (QSAR) analysis software.

* * * * *